March 17, 1953  L. G. HOPPES  2,631,760
FERTILIZER MACHINE
Filed Aug. 5, 1947  3 Sheets-Sheet 1

Inventor
Lloyd G. Hoppes

By *Clarence A. O'Brien and Harvey B. Jacobson*
Attorneys

March 17, 1953 L. G. HOPPES 2,631,760
FERTILIZER MACHINE
Filed Aug. 5, 1947 3 Sheets-Sheet 2
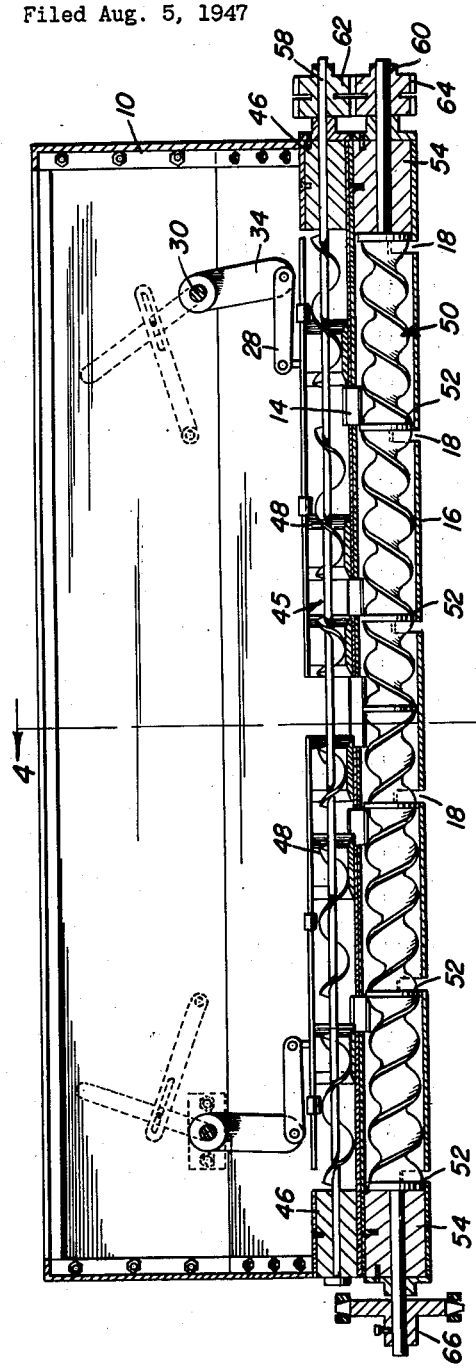
Inventor
Lloyd G. Hoppes March 17, 1953  L. G. HOPPES  2,631,760
FERTILIZER MACHINE Filed Aug. 5, 1947  3 Sheets-Sheet 3

Inventor

Lloyd G. Hoppes

By *Clarence A. O'Brien*
*and Harvey B. Jacobson*
Attorneys

Patented Mar. 17, 1953

2,631,760

UNITED STATES PATENT OFFICE 2,631,760

FERTILIZER MACHINE

Lloyd G. Hoppes, Raton, N. Mex.

Application August 5, 1947, Serial No. 766,423

1 Claim. (Cl. 222—238)

This invention appertains to novel and useful improvements in farm implements, particularly that type which may be utilized for distributing fertilizer and/or grain.

An object of this invention is to urge fertilizer and grain longitudinally of a hopper, urge the said grain through outlets in the hopper which are valve controlled, further bias the fertilizer and grain to a selected position in individual compartments, thence expel the same through outlets in each of said compartments.

Another object of this invention is to provide means for carrying out the above described function.

Another purpose of this invention is to provide improved means for actuating a first auger and a second auger in opposite directions.

Another purpose of this invention is to treat fertilizer and grain within said hopper in such a manner as to separate foreign material from the said fertilizer and grain prior to ejection from the apparatus.

Another purpose of this invention is to provide improved valve means capable of being locked in a selected position thereby regulating the ports pertinent to the said valve means.

Another purpose of this invention is to provide an extremely versatile, inexpensive and efficient device of the character to be described which lends itself well to commercial manufacture.

Ancillary objects and features of novelty will become apparent to those skilled in the art, in following the description of the preferred embodiment of the present invention, illustrated in the accompanying drawings, wherein:

Figure 3 is a longitudinal sectional view of the invention disclosed in Figure 1 and taken substantially on the line 3—3 thereof and in the direction of the arrows;

Figure 5 is a perspective view of the valve means and actuation means therefor forming part of the present invention;

Referring now in detail to the illustrated preferred embodiment of the present invention, like reference characters are used throughout to indicate similar elements.

Figure 1:
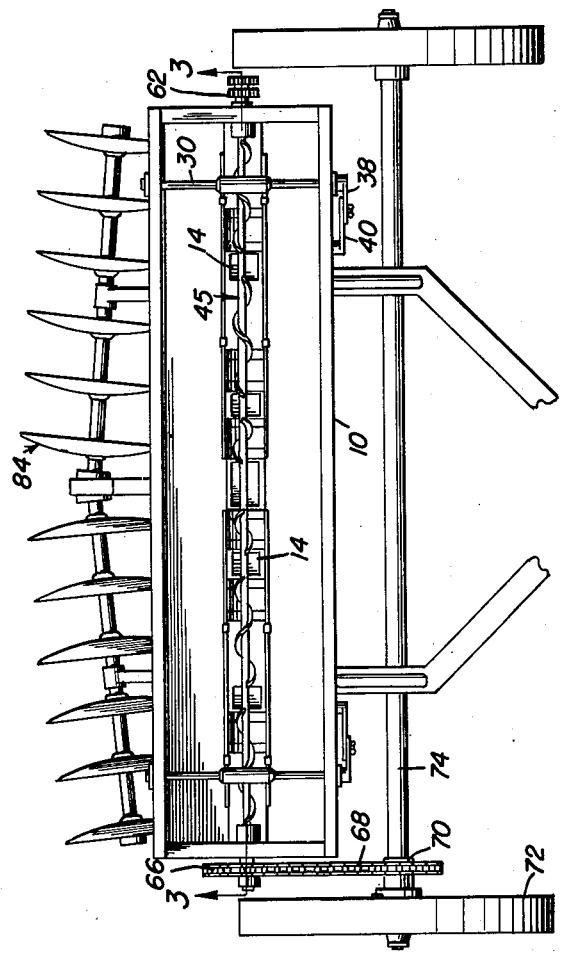
Figure 1 is a plan view of the invention.

This invention has been developed to provide a device for distributing both grain and fertilizer either simultaneously or solely. There is a demand for a type of device which is both inexpensive and efficient in use. Of course, there are many inexpensive devices provided for the purpose of distributing fertilizer and grain. However, many of the conventional devices are rendered inoperative due to foreign objects which invariably appear in grain, fertilizer and the like. These foreign objects are well-known to be stones, sticks, portions of straw, and various other unexpected items.

The present invention has within its purview the purpose of separating the vast majority of these foreign objects prior to ejection of fertilizer and grain from the hopper associated with this invention. Also, this function is performed by utility of very simple, inexpensive mechanical elements.

A hopper 10 is provided with a partition 12 extending thereacross. This partition extends adjacent the outlet portion of the said hopper and has a plurality of apertures 14 extending longitudinally thereof and spaced relative to each other. Extending beneath the said partition 12 is a housing 16 which also has a plurality of apertures or outlets 18 at the bottom thereof.

Valve means for selectively controlling the effective sizes of the said apertures 14 is provided. This valve means may be seen particularly well in Figure 5 wherein there is disclosed a pair of rods 20 and 22 respectively journalled in suitable bearings 24. Small perches 26 extend from each of the said rods and pitman arms 28 are secured thereto. A shaft 30 extends through the said hopper 10 and has a pair of links 32 and 34 respectively secured thereto. These links form seats for the said pitman arms 28 and also cooperate to provide a direct connection for actuation of the valve plates 36 extending across the said rods 20 and 22 respectively. Positioned on the terminal portion of the said shaft 30 is an actuation bar 38 which has an aperture extending therethrough. Received in this aperture is a wing nut and bolt construction which connect with a locking means. This locking means is simply a bar 40 pivoted to the side of the said hopper 10 having a slot 42 therein. This slot 42 is received around the bolt and cooperates with the wing nut for the purpose of locking the said shaft 30 in a selected position of rotation. Obviously, by this construction the valve plate 36 may be locked in a selected position relative to the said apertures 14. Of course, by this means, the size of the said apertures 14 which are affected may be regulated.

An auger generally indicated at 45 is journalled in suitable bearings 46, which are in turn secured to the said hopper 10. The said auger 45 is preferably composed of a plurality of sections of screws 48 which are oppositely threaded to each other. Of course, by utility of this opposite thread construction the grain, fertilizer or the like which is retained in said hopper 10 is urged from opposite ends of the said hopper 10. Also, a preferable construction is to provide one auger section for each of the said outlets 14.

A second auger or urging means 50 is provided in the said housing 16. The screw of the second auger 50 has shorter lead than the screw of the auger 45 and said screws are rotated at substantially the same speed whereby the long lead of auger 45 is more than the movement of material by the auger 50 and produces a grinding action in the material. A plurality of disks 52 are secured along the longitudinal axis of the said auger 50, which is also secured to suitable bearing blocks 54 in the said housing 16. It will be noted that a corresponding number of outlets 18 are provided in the housing 16 to cooperate with each auger section. Also, the said collars 52 serve a dual purpose of a baffle and also a limiting wall defining chambers in the said housing 16. A selected aperture 14 directs the contents of the hopper 10 into selected chambers and the outlets 18 emit fertilizer and grain from each individual compartment. It will be noted at this point that it is within the purview of the present invention to supply various types of augers for utility with this invention. Of these types, the conventional paddle type may be used as well as many others.

Received on the terminal portions of the shafts 58 and 60, pertinent to the augers 45 and 50, is a plurality of gears. These gears may be seen at 62 and 64 which are respectively enmeshed. At the opposite end of the stub shaft 60 a driven gear 66 is adjustably secured. This driven gear 66 has a chain 68 secured therearound which also engages another gear 70. Now, this last mentioned gear 70 is rigidly secured to a wheel 72 which is in turn journalled on a conventional axle 74. Of course, upon rotation of the said wheel 72, the said gear 70 and in turn the gear 66 will be rotated. Further, upon rotation of the said gear 66 the auger 50 and auger 45 will be actuated through utility of the said gears 62 and 64 respectively.

In order that rotation in one direction only may be effected, a ratchet gear 76 is fixed to the wheel hub 78 and a pivoted dog 80 is in operative engagement with the said ratchet gear 76. A resilient clip or spring 82 urges the said dog 80 against the teeth of the said gear 76 as is conventional in ratchet-type constructions.

Figure 2:
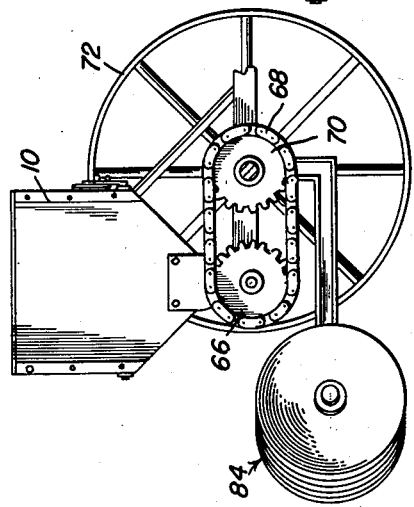
Figure 2 is an elevational side view of the invention shown in Figure 1.
Figure 8:
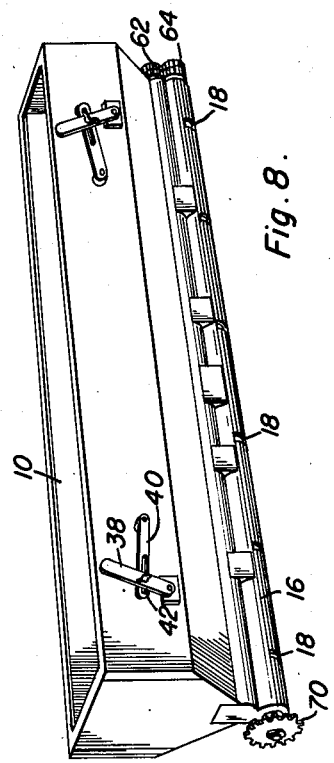
Figure 4:
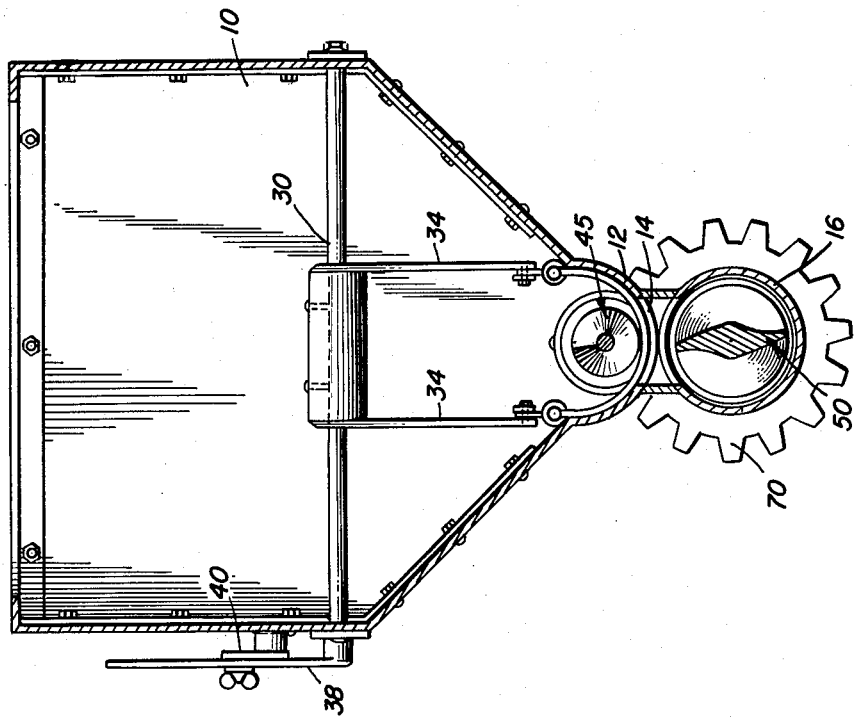
Figure 4 is a transverse sectional view of the invention shown in Figure 3 and taken substantially on the line 4—4 thereof and in the direction of the arrows.
Figures 6, 7:
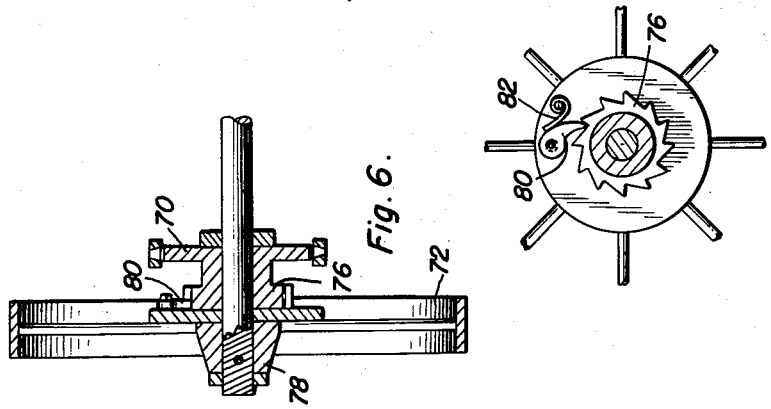
Figure 6 is a sectional view of the drive wheel used in conjunction with the present invention.
Figure 7 is a fragmentary plan view of the inner portion of the drive wheel, illustrating the ratchet means utilized therewith; and, Figure 8 is a perspective view of the hopper forming part of the present invention.

Viewing Figure 2, it will be noted that it is within the purview of the present invention to supply a cultivator, generally indicated at 84 for utility in conjunction with the present invention. This cultivator may be conventional in nature and of many types.

While there has been described and illustrated but a single preferred embodiment of the present invention, it is apparent that various departures may be made therefrom without departing from the spirit of the invention. Accordingly, limitation is sought only in accordance with the scope of the following claim.

Having described the invention what is claimed as new is:

A fertilizer distributing apparatus comprising, a hopper having a bottom, said bottom having a plurality of longitudinally spaced openings, a partition extending across the hopper and spaced above the bottom, said partition having a plurality of longitudinally spaced openings therein in staggered relation to the openings in the bottom, a plurality of long lead upper auger screw sections longitudinally of the hopper and rotatably mounted therein above the partition, a plurality of lower relatively short lead auger screw sections longitudinally of the hopper and rotatably mounted therein between the bottom and partition, said lower auger sections positioned in one side of said hopper being of a reversed pitch from those on the opposite side of said hopper whereby to move the fertilizer away from the center of said hopper, the relative leads and sizes of the respective auger screw sections being such that the upper auger screw section moves the fertilizer materially faster than the lower auger screw section, spaced divider means on the lower auger screw adjacent to each of the openings to form chambers between the bottom and partition, an opening in the partition and an opening in the bottom being in each chamber intermediate adjacent divider means with one opening adjacent one end and the other opening adjacent the other end of the respective chamber for movement of fertilizer by the lower auger from the opening in the partition to the opening in the bottom for discharge therethrough, and means for rotating the upper and lower auger screws at substantially the same speed.

LLOYD G. HOPPES.

REFERENCES CITED

The following references are of record in the file of this patent:

UNITED STATES PATENTS

| Number | Name | Date |
|---|---|---|
| 135,846 | Reames | Feb. 11, 1873 |
| 224,909 | Hill | Feb. 24, 1880 |
| 721,733 | Nance | Mar. 3, 1903 |
| 838,533 | Genet | Dec. 18, 1906 |
| 993,815 | Beardsley | May 30, 1911 |